United States Patent
Pukkila et al.

(10) Patent No.: US 6,996,194 B2
(45) Date of Patent: Feb. 7, 2006

(54) METHOD AND ARRANGEMENT FOR ITERATIVELY IMPROVING A CHANNEL ESTIMATE

(75) Inventors: Markku Pukkila, Espoo (FI); Nikolai Nefedov, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 728 days.

(21) Appl. No.: 09/737,093

(22) Filed: Dec. 14, 2000

(65) Prior Publication Data

US 2001/0004390 A1 Jun. 21, 2001

(30) Foreign Application Priority Data

Dec. 15, 1999 (FI) .............................................. 19992691

(51) Int. Cl.
*H03D 1/00* (2006.01)
*H04L 27/06* (2006.01)

(52) U.S. Cl. ....................... 375/340; 375/229; 375/231; 375/232

(58) Field of Classification Search ................ 375/231, 375/340, 232, 350
See application file for complete search history.

(56) References Cited

U.S. PATENT DOCUMENTS

| | | | | |
|---|---|---|---|---|
| 5,331,662 A | * | 7/1994 | Desperben et al. | 375/232 |
| 6,304,995 B1 | * | 10/2001 | Smith et al. | 714/786 |
| 6,459,728 B1 | * | 10/2002 | Bar-David et al. | 375/231 |
| 6,662,337 B1 | * | 12/2003 | Brink | 714/792 |
| 6,665,357 B1 | * | 12/2003 | Somayazulu | 375/341 |

FOREIGN PATENT DOCUMENTS

| | | |
|---|---|---|
| EP | 0954144 A1 | 11/1999 |
| WO | WO 97/44916 | 11/1997 |
| WO | WO 00/25442 | 5/2000 |

OTHER PUBLICATIONS

"Co-channel Interference Cancelling Receiver for TDMA Mobile Systems", Ranta et al., Proc. ICC'95, pp. 17–21.
"Iterative Channel Estimation Using Soft Decision Feedback", Sandell et al., GLOBECOM'98, pp. 3728–3733.
"Decision–Feedback Equalization of Time–Dispersive Channels With Coded Modulation", Zhou et al., IEEE Transaction on Communications, vol. 38, No. 1, 1990, pp. 18–26.
"Improved Adaptive Decision–Feedback Equalization With Interleaving For Coded Modulation Systems", Wang et al., Global Telecommunications Conference, 1994, Proceedings vol. 1, pp. 6–10.
"Interative Joint Sequence And Channel Estimation For Fast Time–Varying Intersymbol Interference Channels", Chang et al., International Conference On Communications, 1995, Gateway to Globalization, Proceedings, pp. 357–361.

* cited by examiner

*Primary Examiner*—Stephen Chin
*Assistant Examiner*—Harry Vartanian
(74) *Attorney, Agent, or Firm*—Perman & Green, LLP

(57) ABSTRACT

A method and an arrangement are provided for generating an estimate of the impulse response of a radio channel. There is generated (202, 406) an initial estimate of the impulse response of a radio channel, and a signal is equalized (203, 407) by using the initial estimate. The equalized signal is decoded (205, 409). There is obtained (411) feedback information from the signal (306) after equalization, an updated channel estimate is generated (304 412) by using said feedback information, and the signal is equalized (407) again by using said updated channel estimate and said feedback information.

30 Claims, 4 Drawing Sheets

METHOD AND ARRANGEMENT FOR ITERATIVELY IMPROVING A CHANNEL ESTIMATE

TECHNOLOGICAL FIELD

The invention concerns generally the technology of generating a channel estimate for the purposes of signal equalization in a radio receiver. Especially the invention concerns the use of iterative updating in association with channel estimation and signal equalization.

BACKGROUND OF THE INVENTION

In many TDMA (Time Division Multiple Access) based radio receivers there is used a functional block known as the signal equalizer for recovering transmitted data from a received signal which has been corrupted by noise and intersymbol interference. The task of recovering the transmitted data is usually denoted as either equalizing or detecting for short. Typical radio receivers that use a signal equalizer are the receiver parts in mobile stations and base stations of cellular radio systems. A signal equalizer needs to know the impulse response of the radio channel to a certain extent for the equalization to be successful.

FIG. 1 illustrates a known arrangement where an analog oscillating signal on a radio frequency is received through an antenna 101, downconverted onto a baseband frequency in a radio receiver 102 and converted into a series of digital samples in an A/D converter 103. The samples are led both into a channel estimator block 104 and a signal equalizer block 105. The former uses a certain part of the received signal (usually known as the training sequence) to estimate the impulse response of the radio channel, and provides the impulse response estimate to the signal equalizer block 105. The signal equalizer block 105 performs the equalization and gives at its output both the recovered data (the so-called hard decision output) and some reliability information (soft decision output) associated with the recovered data. These are passed on to a channel decoder 106 which removes all channel decoding (if any) from the original information symbol sequence which was subjected to transmission. The channel decoding operation may comprise additional operations like de-interleaving, and the reconstructed information symbols may be conveyed further e.g. to an audio or video decoder, to a data storage device or to some control circuitry.

In a TDMA system the received signal consists of discrete transmission blocks, each of which is received in a certain time slot. The conventional way of performing channel estimation and signal equalization is to use a training sequence with known contents within the transmission block to generate an estimate of the radio channel's impulse response (also known as the channel estimate for short), to fix the equalization function on the basis of the obtained channel estimate and to equalize the whole received transmission block by using the same equalization function. The drawback of the traditional scheme is that it requires a relatively long training sequence for the channel estimation to succeed, so that for a remarkable percentage of time the radio channel is reserved for the transmission of fixed training symbol values instead of useful data. Even then the performance of the channel estimation and signal equalization operations may not always be best possible.

There has been proposed a so-called iterative equalization or turbo equalization approach which means that the channel decoder 106 provides the signal equalizer 105 with information concerning the results of the channel decoding process, and the signal equalizer performs a new equalization round on the basis of the provided information. The feedback connection that is needed for performing iterative equalization is shown as a dashed line in FIG. 1. Basically the iteration rounds, i.e. the consecutive times of equalizing, decoding and providing updated information from the decoder to the signal equalizer, may be repeated for an arbitrary number of times. However, that approach has not been found to remarkably improve the performance of a receiver in all cases.

An article "Iterative channel estimation using soft decision feedback" by M. Sandell, C. Luschi, P. Strauch and R. Yan, GLOBECOM'98, pp. 3728–3733, December 1998, presents an iterative channel estimation scheme with either hard or soft decision feedback from a the channel decoding stage to the channel estimator. In the proposed arrangement the channel estimator calculates a new channel estimate from a sequence of symbol decisions it receives from either the signal equalizer or the channel decoder or both. The authors claim that an iteratively refined channel estimate results in enhanced bit error ratios.

SUMMARY OF THE INVENTION

It is an object of the invention to provide a method and an arrangement for enhancing the performance of a radio receiver that relies on signal equalization. It is an additional object of the invention to provide a method and an arrangement of the mentioned kind which would not add prohibitively much to the complexity of the receiver.

The objects of the invention are achieved by both iteratively updating the channel estimate and iteratively refining the signal equalization.

The method according to the invention comprises the steps of generating an initial estimate of the impulse response of a radio channel, equalizing a signal by using the initial estimate and decoding the equalized signal;

it is characterized in that it comprises the steps of obtaining feedback information from the decoded signal, generating an updated estimate of the impulse response of the radio channel by using said feedback information and equalizing the signal by using said updated estimate.

The invention applies also to a receiver arrangement which comprises a channel estimator for generating an initial estimate of the impulse response of a radio channel, a signal equalizer for equalizing a signal, the signal equalizer being coupled to the channel estimator so as to receive the estimate generated by the channel estimator and a signal decoding unit coupled to the signal equalizer for decoding the equalized signal;

it is characterized in that it comprises means for coupling feedback information from the decoded signal into the channel estimator, and the channel estimator is arranged to generate an updated estimate of the impulse response of the radio channel by using said feedback information.

In the research which led to the present invention it was found that the inadequate performance of known iterative signal equalization schemes comes at least partly from the fact that the known arrangements expect the impulse response of the radio channel to be more or less perfectly known. However, all known ways of estimating the impulse response of a radio channel are approximate, meaning that the channel estimate provided by the channel estimator to the signal equalizer is more or less distorted. According to the present invention it is possible to increase the accuracy of the channel estimate by feeding back information from the channel decoder to the channel estimator.

The iterative calculation of a channel estimate requires that the receiver is able to produce a certain initial channel estimate without any prior knowledge from the decoding decisions. There are many known conventional "one-shot" channel estimation methods which the receiver may use, including but not being limited to the LMS (Least Mean Squares) method. Only the training sequence is available for the initial channel estimation, because no decoding decisions have yet been taken regarding the rest of the symbols in the transmission block.

The aim of iteratively refining the channel estimate is to use the result thereof as a part of an iterative signal equalization and channel decoding arrangement. A certain passage of a received signal is taken through the channel decoder more than once, so that at a certain later round of channel decoding the version of the received signal that goes into the channel decoder has been equalized by using a more reliable channel estimate than on a certain previous round. The later channel decoding round is likely to yield a reconstructed sequence of information symbols with fewer erroneous symbols than the previous one. Ultimately the effect of iterative channel estimation is seen as a lower bit error ratio as a function of $E_b/N_0$ (the relation of received information bit energy to noise density).

The basic principle of iteratively updating a channel estimate is known from the article referred to in the description of prior art. However, the effectiveness of iteration in enhancing the quality of the channel estimate depends heavily on the quality of the symbol decisions which are fed back from the channel decoder to the channel estimator. If the decisions are reliable, i.e. a relatively high number of information symbols have already been reconstructed successfully, iteration will probably improve the quality of the channel estimate and result in even fewer number of erroneous symbol decisions. If there are lots of decoding errors to start with, the new channel estimate may become very unreliable, which may cause even more erroneous symbol decisions and lead the whole process towards divergence. In accordance with the invention it is possible to suppress such disadvantageous effects either by requiring that the signal must have been received with a C/I (carrier to interference) or S/N (signal to noise) ratio or other quality-indicating quantity which is above a certain threshold or by weighting the symbol decisions fed back from the channel decoder according to their estimated reliability.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 has been described in the previous parts of the specification.

DETAILED DESCRIPTION OF THE INVENTION

Figure 1:
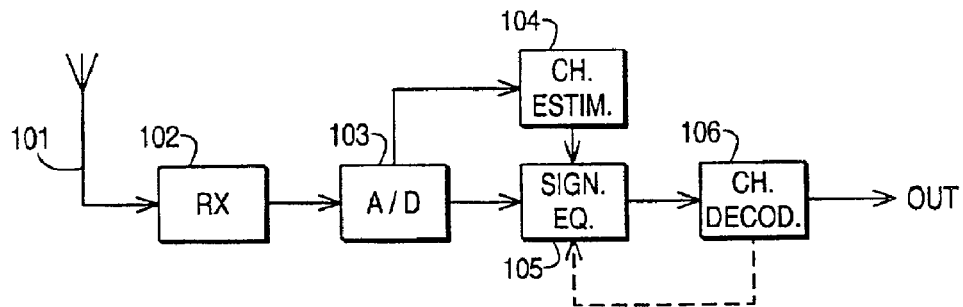
FIG. 1 illustrates a known receiving and decoding arrangement.
Figure 2:
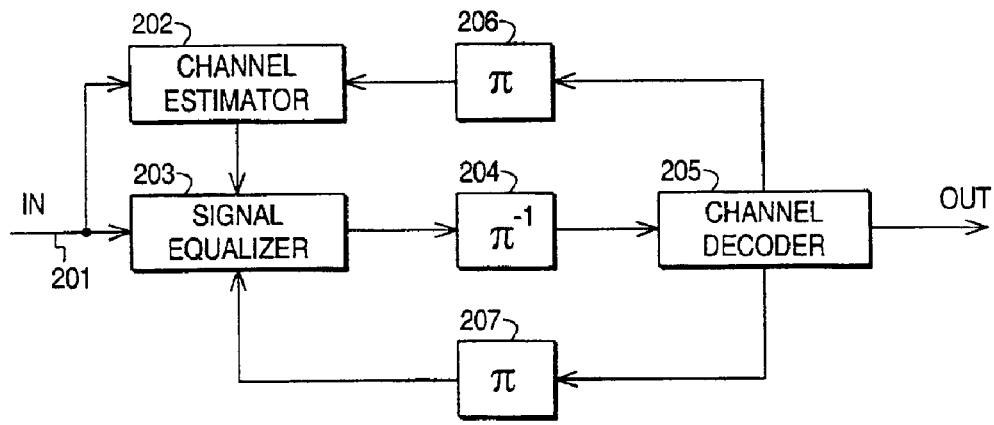
FIG. 2 illustrates an arrangement according to an embodiment of the invention.

FIG. 2 illustrates an iterative channel estimation and signal equalization arrangement according to an advantageous embodiment of the invention. From the left in the figure comes an input line 201 through which there come samples that represent a received (and downconverted and A/D-converted) signal. Since we are dealing with digital communication where signals are transmitted and received in certain discrete transmission blocks, we may use the designation y for a vector that contains the samples representing one received transmission block. The vector y contains both unknown information symbols and known symbols that belong to a training sequence.

The input line 201 is coupled both to a channel estimator 202 and a signal equalizer 203. From the former to the latter there is a connection for providing a channel estimate to the purposes of signal equalization in a manner known as such. The output of the signal equalizer 203 is coupled to a block 204 which represents any arbitrary signal processing which is done on the equalized signal before channel decoding. This signal processing is described in general with the operator $\pi^{-1}$ and it typically involves e.g. de-interleaving. The output of the signal processing block 204 is coupled to the input of a channel decoder 205, the output of which 206 is shown at the right in FIG. 2.

From the channel decoder 205 there are couplings also to the other two signal processing blocks 206 and 207 which essentially perform the inverse of the operations represented by operator $\pi^{-1}$ in block 204. For example, if block 204 implements de-interleaving, the inverting blocks 206 and 207 implement re-interleaving. The output of the first inverting signal processing block 206 is coupled to the channel estimator 202 and the output of the second inverting signal processing block 207 is coupled to the signal equalizer 203. This arrangement is naturally shown only for conceptual clarity: it is more likely that in a practical arrangement there would be only one inverting signal processing block coupled to the channel decoder so that the output of the single inverting signal processing block would be coupled both to the channel estimator and the signal equalizer. From the viewpoint of the invention the blocks 204, 206 and 207 have only the task of showing that direct connections between the other blocks are not required.

The arrangement of FIG. 2 operates as follows. When a sample vector y is received through the input line 201, the channel estimator 202 uses those samples thereof that represent the symbols belonging to the training sequence to generate an initial channel estimate, i.e. an initial estimate of the impulse response of the radio channel. The invention does not limit the selection of method(s) which the channel estimator block 202 uses to generate the initial channel estimate, which in the following is denoted by $\hat{h}_k$. The signal equalizer 203 receives the initial channel estimate $\hat{h}_k$ from the channel estimator 202 through their mutual coupling and uses it to equalize the sample vector y. Again the invention does not limit the selection of method(s) which the signal equalizer 203 uses in equalizing the signal.

The equalized sample vector y is taken through the signal processing block 204 to the channel decoder 205 which performs channel decoding. The result of channel decoding is a sequence of decoding decisions which represent the channel decoder's best possible estimate of the original symbols which a transmitter used to construct the transmission block. The channel decoder may apply either hard or soft decisions, meaning that the reconstructed symbols may either have fixed values with no explicit reference to their reliability (hard decisions) or they may have associated with probability values that indicate the estimated reliability of each symbol.

We assume first that hard decisions are applied. The symbol decisions are fed back from the channel decoder 205 through the first inverting block 206 to the channel estimator 202 and through the second inverting block 207 to the signal equalizer 203. The inverting blocks cancel the effect of block 204, so the symbol decision sequences received from the channel decoder 205 by the channel estimator 202 and the signal equalizer 203 are compatible with the original sample vector y.

According to the invention, the channel estimator 202 uses the feedback information it has received from the channel decoder to generate an updated channel estimate. The process is comparable to the generation of a channel estimate on the basis of a sample sequence with more known symbols than they were in the training sequence of the transmission block. However, we must note that the feedback information does not contain all the correct original information symbols with 100% reliability. The process of generating the updated channel estimate must therefore be selected so that the feedback information does not completely replace the original sample vector y but comes as additional information to the process of generating the channel estimate. The invention does not limit the selection of method(s) which the channel estimator 202 uses to generate the updated channel estimate, as long as the feedback information is taken into account (subject to the limitations explained later). One advantageous possibility is to use a formula for adaptive LMS adaptation $$\hat{h}_{k+1} = \hat{h}_k - \mu M_k^H (M_k \hat{h}_k - y)$$

where $\hat{h}_{k+1}$ is a (k+1):th channel estimate vector, $\hat{h}_k$ is a k:th channel estimate vector, $\mu$ is a real constant that determines a step size for the iterative algorithm, $M_k$ is a matrix that contains the symbol decisions given by the channel decoder as a result of decoding the signal the equalization of which was based on the k:th channel estimate, and y is the original sample vector.

The signal equalizer 203 receives the updated channel estimate, designated above as $\hat{h}_{k+1}$, from the channel estimator and uses it for equalizing the signal vector y again. In the process of re-equalizing the signal equalizer 203 may additionally use the feedback information obtained from the channel decoder 205 through block 207. The technology of using such feedback information in the process of re-equalizing is known as such from the field of iterative signal equalization referred to in the description of prior art. The difference between prior art and the arrangement of FIG. 2 is the fact that the signal equalizer 203 uses the updated channel estimate and not the original, training sequence based channel estimate in performing the re-equalization.

In principle the re-equalization could be based on the original sample vector y alone by applying just the updated channel estimate. This is the case in one of the prior art publications described previously. However, it is easy to show that the best performance is obtained by combining the iterative channel estimation with iterative signal equalization.

The maximum number of iteration rounds in the arrangement of FIG. 2 is not limited by the invention but merely by the computational capacity of the receiver. The higher the number of iteration rounds, the higher should become the reliability of the decoding result, although a certain saturation effects stipulates that after a certain number of iterations there is no improvement any more. The iterations on channel estimation and signal equalization need not be synchronized: it is possible e.g. to first iterate a first number of times just to improve the quality of the channel estimate and then fix the channel estimate and continue iterating on the signal equalization.

The success of the iterative channel estimation depends on the quality of the symbol decisions provided by the channel decoder. If the symbol decisions contain many errors, the iteration rounds are likely to degrade the quality of the channel estimate instead of improving it. Therefore it may be advantageous to make the receiver monitor the signal to noise ratio, the carrier to interference ratio or some other quantity of the received signal that gives an indication of the chances of making correct decoding decisions. The receiver usually performs such monitoring anyway, because the results are useful also in relation to other functionalities of the receiver than iterative channel estimation. In an advantageous embodiment of the invention there exists a threshold so that the monitored quantity must be at least as good as the threshold in order for the iterative channel estimation to be allowed.

There exists an alternative way of counteracting the effects of low reliability associated with the decoding decisions. In the foregoing we have assumed that the decoder makes hard decisions. If we now depart from this assumption, we have also the probability value(s) available which the channel decoder uses to describe the reliability of the decoding decisions. There are either a number of stored transition probabilities that describe the probabilities of certain state transitions made during the decoding process, or a metric value that concentratedly represents the estimated reliability of a selected decoding path. The reliability of the decoding may be taken into account by weighting the feedback information according to reliability. In the exemplary adaptive LMS case above, this means that either the elements of the matrix $M_k$ are set to represent the individual transition probabilities associated with decoding decisions, or the real iteration step factor $\mu$ is a function of the average reliability of the decoding round.

Figure 3:
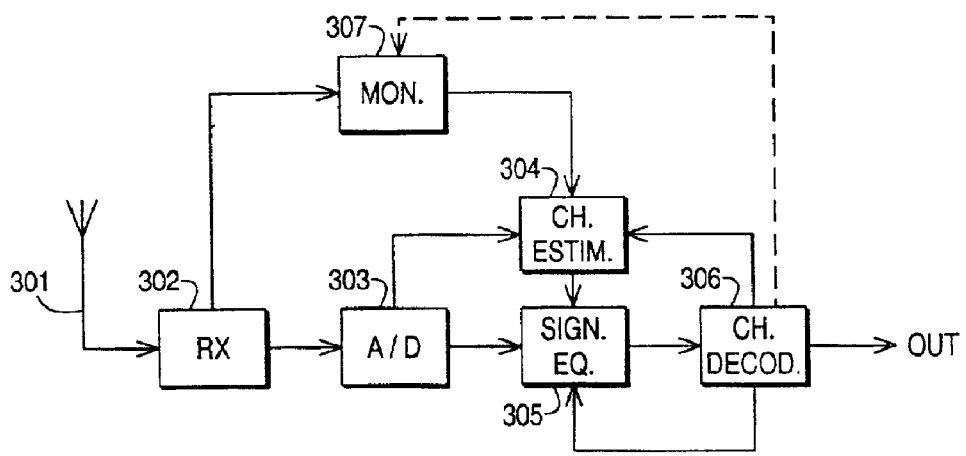
FIG. 3 illustrates a receiving and decoding arrangement according to an embodiment of the invention.

FIG. 3 illustrates a radio receiver which is arranged to utilize a process of iterative channel estimation according to an advantageous embodiment of the invention. An analog oscillating signal on a radio frequency is received through an antenna 301, downconverted onto a baseband frequency in a radio receiver 302 and converted into a series of digital samples in an A/D converter 303. The samples are led both into an iterative channel estimator block 304 and an iterative signal equalizer block 305. The latter performs signal equalization and passes on the resulting output information to a channel decoder 306 which removes the effects of channel coding from the symbol sequence which was subjected to transmission. Here additional processing operations like de-interleaving and corresponding inverse operations like re-interleaving (cf. blocks 204, 206 and 207 in FIG. 2) are considered to be parts of the channel decoding process in block 306. The reconstructed information symbols may be conveyed further e.g. to an audio or video decoder, to a data storage device or to some control circuitry.

The arrangement of FIG. 3 includes also a monitoring block 307 which is arranged to receive an estimate of the current signal to noise ratio or carrier to interference ratio from the radio receiver 302 and to switch the iterative channel estimation either on or off according to the current value of the monitored quantity. There is also shown, as a dashed arrow, a way of obtaining additional control information to the monitoring block 307 from the channel decoder 306. The use of such a connection is explained later.

Figure 4:
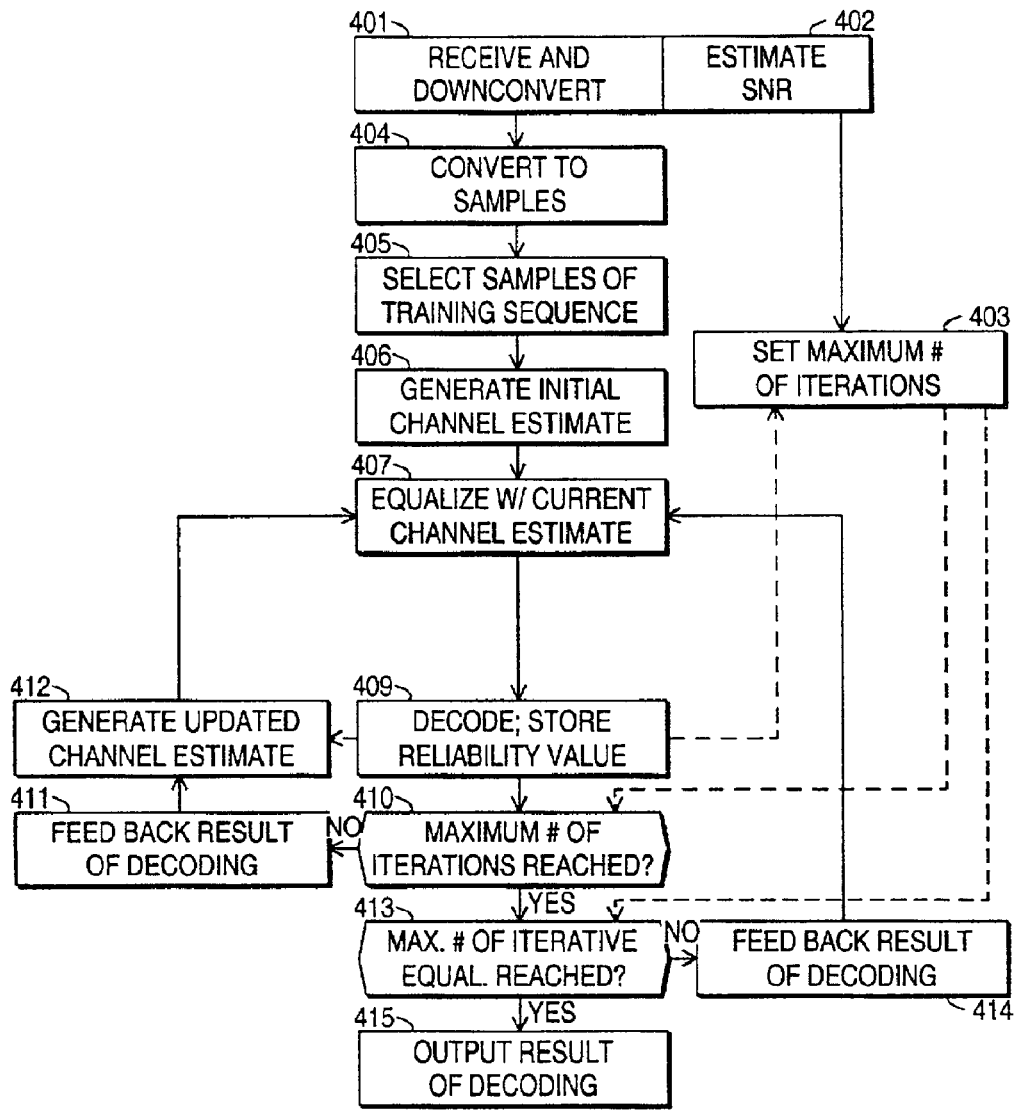
FIG. 4 illustrates a method according to an embodiment of the invention.

FIG. 4 is a flow diagram of a method according to an advantageous embodiment of the invention. At step 401 a receiver receives and downconverts a transmission block. In association with the reception the receiver estimates the signal to noise ratio or other quality-indicating quantity at step 402. The estimated quality of the received signal has a central role in setting the maximum number of iterations at step 403. In FIG. 4 we assume that the number of iterations for iterative channel estimation and iterative signal equalization may be set separately. Typically, if the estimated quality of the received signal is below a certain threshold, the optimal value of which may be set through experimenting and simulation, at step 403 the maximum number(s) of iteration are set so that no actual iteration will be performed. Additionally we assume that certain other factors, described in more detail below, may affect the determination of the maximum number of iterations.

At step 404 the received and downconverted analog signal is converted into digital samples. The steps of reception, downconversion and sampling are as such of no importance to the invention, but they are shown here as exemplary ways of obtaining a sequence of samples which is the basis for channel estimation, signal equalization and decoding.

At step 405 the receiver identifies those samples which are associated with a training sequence or a corresponding known part of the received transmission block. At step 406 the receiver uses the selected samples to generate an initial channel estimate. The first round of equalization at step 407 uses the initial channel estimate, because no detection decisions or corresponding updated channel estimates are available yet.

The next step in FIG. 4 is channel decoding at step 409. Channel decoding itself may be based on e.g. known forms of Viterbi decoding, if the transmitter used a convolutional encoder for channel encoding the signal to be transmitted. Viterbi decoding in its basic form gives only hard decision outputs. Instead, in FIG. 4 we have assumed that channel decoding relies on the SISO (Soft In-Soft Out) principle so that at step 409 there is stored at least one realibility value which describes the estimated reliability of the current decoding result. The invention does not limit the selection of the channel decoding method.

The dashed line from step 409 to step 403 corresponds to the additional control connection from block 306 to block 307 in FIG. 3 and indicates that the estimated reliability of the current channel decoding result may have an effect on the maximum number of iterations for either channel estimation or symbol equalization or both. For example a very high estimated reliability might be interpreted so that further iteration rounds are not necessary, in which case all maximum numbers of iterations are set to a value that will lead to the termination of iterations. A reliability value which is between a certain upper and lower limits, possibly together with a SNR value which is similarly between certain limits, may cause the maximum number(s) of iteration to be set so that still some more iteration rounds will be performed, whereas a very low reliability value, potentially together with a relatively low SNR value might again lead to instant termination of iteration because iterative channel estimation (and/or signal equalization) would only make things worse. Termination of iteration through the interaction of steps 409 and 403 could also result from a discovery showing that the latest iteration did not improve the obtained reliability value from the previous decoding round. In setting the maximum number(s) of iterations one must remember that the allocatable calculational capacity of the receiver must not be exceeded.

The existense of step 403 is not required at all, if we are satisfied with the fact that under certain circumstances performing a constant number of iterations may not improve performance at all, or may even degrade it. Typical examples of situations where SNR suddenly drops, causing potential divergence in iterative channel estimation, are the so-called fading dips where fading due to disadvantageous local interference and/or signal propagation conditions suddenly weaken the carrier frequency which the receiver is listening to.

At step 410 the receiver checks, whether the maximum number of iterations for the iterative channel estimation has been reached. The necessary control information in the form of the currently valid maximum number of iterations comes from step 403, as is indicated by the dashed arrow. A negative finding at step 410 causes a transition to step 411, where the channel decoding results are fed back to the channel estimator and the signal equalizer. At step 412 the receiver generates an updated channel estimate by utilizing the feedback information. It may also take into account the reliability value(s) associated with the feedback information, as indicated by the dashed arrow between steps 409 and 412. After step 412 the receiver returns to step 407 where the recently generated updated channel estimate now replaces the previous channel estimate, and the signal equalization takes into account the decoding results fed back at step 411. It should be noted that replacing the previous channel estimate with an updated one does not mean that all information from the previous channel estimation round is erased: some information is carried on within the updated channel estimate, because its generation took into account both the previous channel estimate and the feedback information.

A positive finding at step 410 causes a transition to step 413 where the receiver checks, whether the maximum number of iterations for the signal equalization has been reached. The necessary control information in the form of the currently valid maximum number of iterations comes from step 403, as is indicated by the dashed arrow. A negative finding causes a transition to step 414, where the the decoding results are fed back to the signal equalizer but not to the channel estimator any more, because iterative channel estimation has been terminated and only iterative signal equalization remains. From step 414 there comes a transition back to step 407, where the signal equalization takes into account the decoding results fed back at step 414 but the channel estimate is the same which was used at the immediately previous time of going through step 407. A positive finding at step 413 indicates that the channel estimation, signal equalization and channel decoding phase is complete and the decoded results is given at the output of the channel decoder.

Some modifications to the flow diagram of FIG. 4 arise if the channel decoding process itself is based on iterative decoding. The iterations on channel decoding may conceptually cause several iterative rounds within step 409; alternatively or additionally the receiver may apply iterative decoding between steps 413 and 415 when the channel estimate and signal equalization have already been fixed.

Figure 5A:
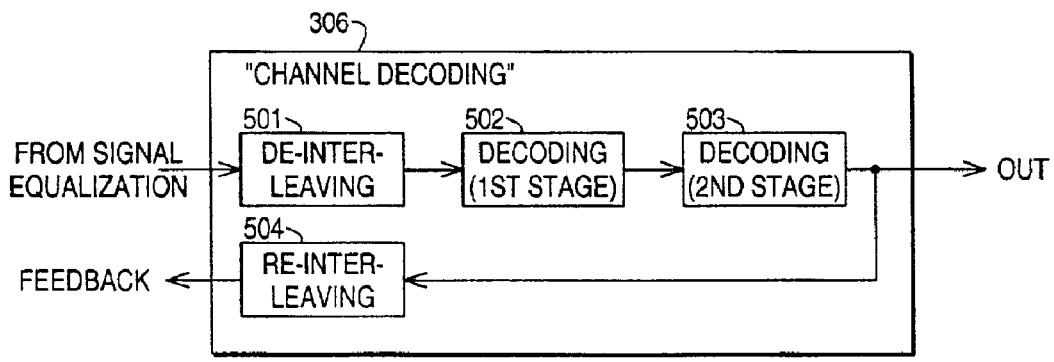
FIGS. 5a to 5d illustrate alternative ways of obtaining feedback information from channel decoding.
Figure 5B:
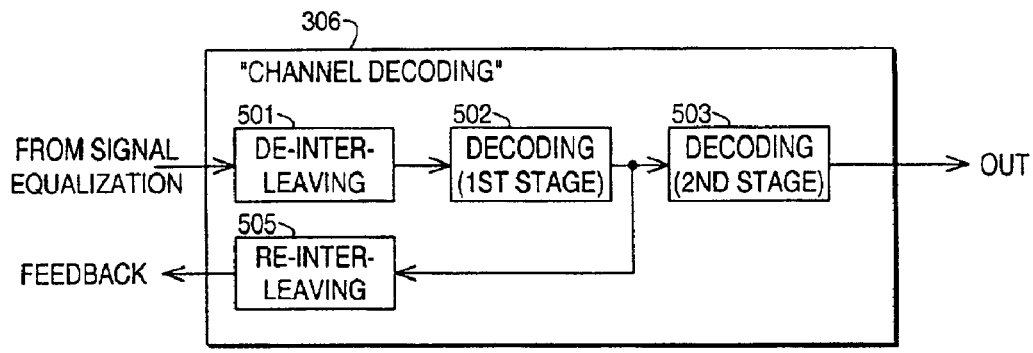
Figure 5C:
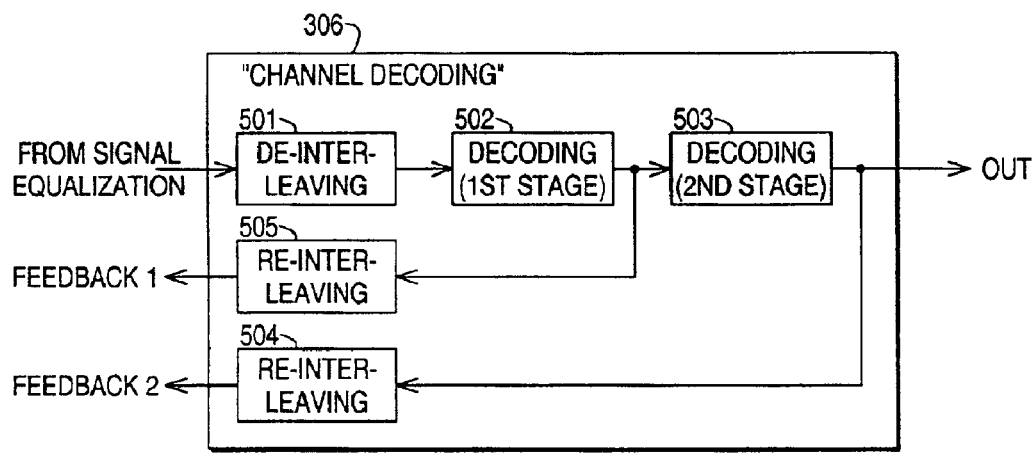

FIGS. 5a, 5b, 5c and 5d illustrate some alternative arrangements for obtaining the feedback information from the block which in FIG. 3 was generally designated as the channel decoder. In FIGS. 5a, 5b and 5c a channel decoding arrangement 306 contains a series connection of a de-interleaver 501, a first SISO decoder 502 (or more generally: a first decoding stage) and a second SISO decoder 503 (or more generally: a second decoding stage). The structure and operation of these blocks is known to the person skilled in the art. Iterative channel decoding is possible, even if not shown, by setting up an inner feedback loop between the decoding stages. In the embodiment of FIG. 5a the feedback information to channel estimation and signal equalization is taken from the output of the second SISO decoder 503 through a re-interleaver 504. In the embodiment of FIG. 5b it is taken from the output of the first SISO decoder 502 again through a re-interleaver 505. FIG. 5c illustrates a combined arrangement where both above-mentioned feedback couplings are available. The invention does not require the use of two or more serially coupled decoding stages; as a generalization we may note that any one of the decoding stages 502 and 503 may be a "nul decoder" which does not affect the signal going therethrough in any way.

Figure 5D:
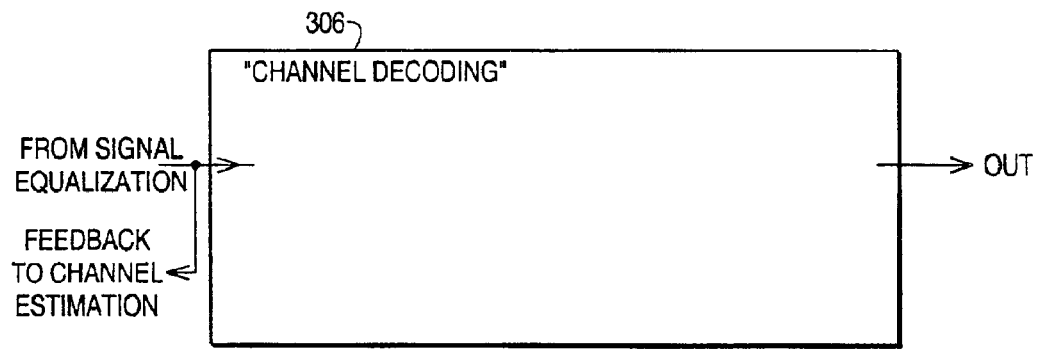

The de- and re-interleaver blocks 501, 504 and 505 represent any signal processing operations which are made before the point from which the feedback information is taken and which therefore must be compensated for in order to make the feedback information compatible with the received signal at the stage when it enters the iterative channel estimator. FIG. 5d shows how the feedback information to the iterative channel estimation step may be taken even directly from the output of the signal equalizer before channel decoding at all. The approach of FIG. 5d can be combined to any of the other approaches shown in FIGS. 5a to 5c in order to get channel decoded feedback information to the signal equalizer and even as an additional input to the channel estimator.

Simulation shows that the invention provides a remarkable improvement in receiver performance especially if the radio channel has a relatively long delay spread, because in such channels conventional one-shot channel estimation methods fail to give a reliable channel estimate due to the limited length of the training sequence.

In a patent application which is filed simultaneously at the priority date of this application by the same applicant there is presented a method and an arrangement for multiplexing several users to the communication channels of a TDMA system. The solution presented therein is based on allowing two simultaneous connections to use a same time slot, and by using coding and decoding arrangements to separate the transmissions related to the different connections. Especially in the uplink direction the solution calls for two mobile stations to transmit in a common time slot allocated for uplink transmission. A training sequence is transmitted exactly in the middle of the time slot and each mobile station uses its own form of the training sequence and only transmits meaningful information on its own side of the training sequence: the first mobile station transmits meaningful information in the first half of the time slot before the training sequence, and the second mobile station transmits meaningful information in the second half of the time slot after the training sequence.

The present invention is especially applicable to the joint channel estimation which a base station must perform in order to separate the two uplink transmissions from each other, because the simultaneous appearance of the two mutually different training sequences tends to impair conventional channel estimation based on the training sequence alone. When the base station has decoded for the first time the meaningful information part sent by one mobile station, it has much more reliable symbol information at its disposal than just a partly corrupted training sequence. Already after feeding back the information from the channel decoding stage for the first time it can generate a much more reliable channel estimate for the signal of the mobile station in question.

Figure 6:
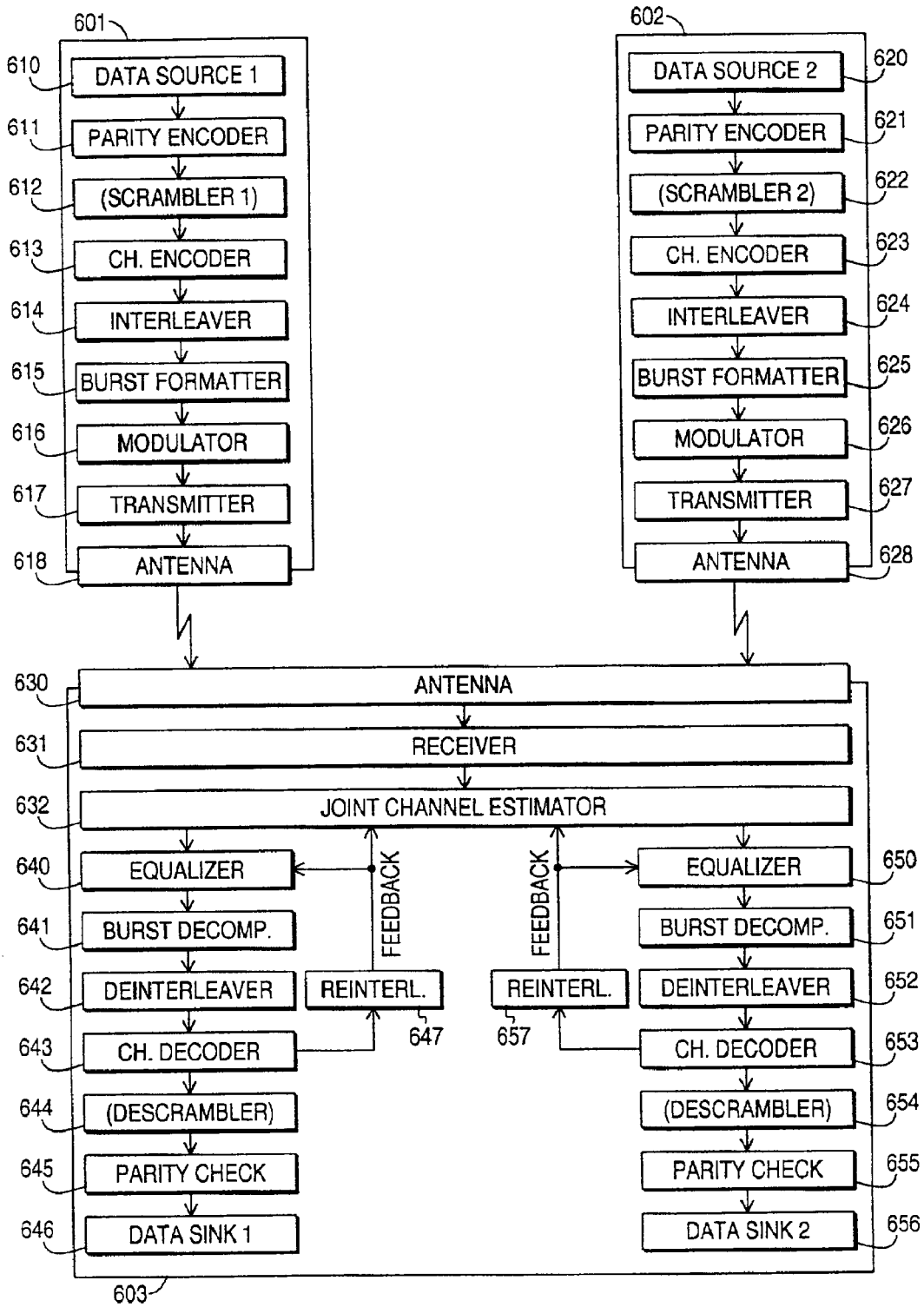

FIG. 6 illustrates a first mobile terminal 601 and a second mobile terminal 602 (or generally: first and second transmitting arrangements) which both have a communication connection to a base station subsystem 603 (or generally: a receiving arrangement). The transmission chain in both mobile terminals is a similar serial connection of a data source 610 (620), a parity encoding unit 611 (621), an optional scrambler 612 (622), a channel encoder 613 (623), an interleaver 614 (624), a burst formatter 615 (625), a modulator 616 (626), a transmitter 617 (627) and a transmitting antenna 618 (628). In the base station subsystem a receiving antenna 630 is coupled through a receiver 631 to a joint channel estimator 632, from which there are connections to two parallel reception subchains. Each reception subchain is a serial connection of an equalizer 640 (650), a burst decomposer 641 (651), a deinterleaver 642 (652), a channel decoder 643 (653), an optional descrambler 644 (654), a parity check unit 645 (655) and a data sink 646 (656).

Figure 7:
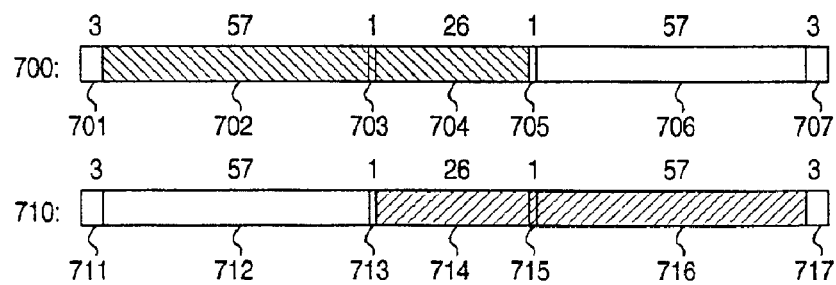
FIG. 6 illustrates a communication arrangement according to an embodiment of the invention and FIG. 7 illustrates a pair of digital bursts which may be used in the arrangement of FIG. 6.

In the arrangement of FIG. 6 the operation of the mobile stations is known to the person skilled in the art except for the way in which the burst formatting units 615 and 625 take interleaved symbols from the corresponding interleavers 614 and 624 as constituents for digital bursts. FIG. 7 illustrates an exemplary pair of digital bursts which generally correspond to the known GSM and EDGE specifications. The first digital burst 700 consists, in this order, of three front tail symbols 701, a (first) data field 702 with 57 data symbols, a (first) stealing flag symbol 703, a training sequence 704 with 26 training symbols, a dummy stealing flag symbol 705, a dummy data field 706 with 57 dummy symbols and three back tail symbols 707. The second digital burst 710 consists, in this order, of three front tail symbols 711, a dummy data field 712 with 57 dummy symbols, a dummy stealing flag symbol 713, a training sequence 714 with 26 training symbols, a (second) stealing flag symbol 715, a (second) data field 716 with 57 data symbols and three back tail symbols 717.

In other words, the modification with respect to the known GSM and EDGE specifications consists of replacing the second stealing flag symbol and second data field in the first digital burst 700 and the first data field and first stealing flag symbol in the second digital data burst 710 with dummy symbols. Additionally each mobile terminal uses its own training sequence in the fields 704 and 714.

The dummy symbols may be some predefined constant symbols or they may mean instants of no transmission of symbols at all (cf. the tail symbols which mean no transmission of symbols at all). It is probably most advantageous to use the latter alternative, because not transmitting at all for the duration of dummy "symbols" means that less interference is generated and transmission power is not used in vain. Keeping the general interference level low is advantageous because it directly improves the overall achievable capacity of a cellular radio system. Savings in transmission power are especially important in portable radio terminals where they help to extend the interval between two successive battery rechargings. For the sake of consistency we will use, throughout this patent application, the designation "dummy symbols" even in association with those embodiments of the invention where nothing is actually transmitted in place of the dummy fields of a transmission burst.

The association of non-dummy fields with certain mobile stations is emphasized by hatching. The modulator 616 (626) converts the digital burst into a transmission burst according to known methods, and the transmitter 617 (627) transmits it through the transmitting antenna 618 (628).

When the base station subsystem receives the simultaneously transmitted transmission bursts produced from the digital bursts 700 and 710 through the receiving antenna 630 and receiver 631, it uses the joint channel estimator 632 to obtain initial channel estimates for the two different training sequences 704 and 714. The invention does not limit the selection of technology for joint channel estimation, but an advantageous method is for example that described in the publication "Co-channel Interference Cancelling Receiver for TDMA Mobile Systems" by P. A Ranta, A. Hottinen and Z.-C. Honkasalo, Proc. ICC'95, pp. 17–21, 1995, which is incorporated herein by reference. When the base station subsystem has obtained initial channel estimates for the propagation channels between it and both mobile terminals, it is able to equalize and decode the data fields from both transmission bursts in the parallel equalizers 640 and 650 and the parallel decoders 643 and 653. Feedback for iterative channel estimation and equalization is provided through the re-interleaving blocks 647 and 657. Note that the use of dummy symbols ensures that the base station subsystem does not receive temporally overlapping data symbols, which should make the improvement obtained through iterative channel estimation considerable.

The above-described examplary embodiments of the invention should not be construed as placing limitations to the scope of applicability of the appended claims. Especially the certain additional features that are disclosed as further developments of the basic invention are not mutually exclusive but can be combined in a multitude of ways.

What is claimed is:

1. A method for generating an estimate of the impulse response of a radio channel, comprising:
    generating an initial estimate of the impulse response of a radio channel,
    equalizing a signal by using the initial estimate,
    obtaining feedback information from the signal after equalization,
    generating an updated estimate of the impulse response of the radio channel by using said feedback information,
    equalizing the signal by using said updated estimate and said feedback information, and
    decoding the equalized signal;
    wherein said generating of said updated estimate of the impulse response comprises weighting said feedback information according to an estimated reliability of a decoding operation performed after said equalizing;
    between equalizing a signal and decoding the equalized signal, processing the signal, and
    between obtaining feedback information from the signal after equalization and generating said updated estimate, inversely processing the feedback information to cancel from the feedback information certain effects caused by said processing the signal.

2. A method according to claim 1, wherein obtaining feedback information from the signal after equalization is performed after decoding the equalized signal, so that said feedback information concerns the equalized and decoded signal.

3. A method according to claim 1, wherein obtaining feedback information from the signal after equalization is performed at least partly before decoding the equalized signal, so that said feedback information concerns at least partly the equalized but not decoded signal.

4. A method according to claim 1, comprising:
    a) receiving a transmission sequence containing, modulated onto a carrier, a certain known symbol sequence and certain unknown symbols,
    b) converting the received transmission sequence into a sample sequence so that a certain first group of samples within said sample sequence represents said known symbol sequence and a certain second group of samples within said sample sequence represent said unknown symbols,
    c) using said first group of samples to generate an estimate of the impulse response of the radio channel over which the transmission sequence was received,
    d) equalizing said sample sequence by using the estimate generated at step (c), thus generating:
        a first piece of hard decision output that maps a number of equalized samples from said second group of samples into information symbol values, and
        a first piece of soft decision output that describes the estimated reliability of said hard decision output, and
    e) making a number of decoding decisions by using said first piece of hard decision output and first piece of soft decision output.

5. A method according to claim 4, wherein step e) comprises making a number of soft decoding decisions, thus generating a second piece of soft decision output, and the method further comprises feeding back said second piece of soft decision output to said generating an updated estimate of the impulse response of the radio channel.

6. A method according to claim 4, wherein step e) comprises making a number of hard decoding decisions, thus generating a second piece of hard decision output, and the method further comprises feeding back said second piece of hard decision output to said generating an updated estimate of the impulse response of the radio channel.

7. A method according to claim 4, comprising feeding back said first piece of hard decision output to generating an updated estimate of the impulse response of the radio channel.

8. A method according to claim 4, comprising feeding back said first piece of soft decision output to generating an updated estimate of the impulse response of the radio channel.

9. A method according to claim 4, comprising repeated iterations through steps c), d) and e) so that at the second and each subsequent time of executing step c) both said first group of samples and said feedback information are used to generate an estimate of the impulse response of the radio channel over which the transmission sequence was received.

10. A method according to claim 9, wherein at the second and each subsequent time of executing step d) there is used the most recently generated updated estimate of the impulse response of the radio channel to equalize said sample sequence.

11. A method according to claim 4, additionally comprising:

feeding back said decoding decisions to equalizing said sample sequence, repeatedly iterating through steps d) and e), and at the second and each subsequent time of executing step d) using both said sample sequence and feedback information from said decoding decisions to equalize said sample sequence.

12. A method according to claim 4, comprising repeatedly iterating a first number of times through steps c), d) and e) so that at the second and each subsequent time of executing step c) both said first group of samples and said feedback information are used to generate an estimate of the impulse response of the radio channel over which the transmission sequence was received, and repeatedly iterating a second number of times through steps d) end e) so that at the second and each subsequent time of executing step d) both said sample sequence and feedback information from said decoding decisions are used to equalize said sample sequence.

13. A method according to claim 4, wherein:

step a) comprise receiving simultaneously at least certain first and second transmission sequences where within said first transmission sequence the first group of samples represents a certain first known symbol sequence and within said second transmission sequence the first group of samples represents a certain second known symbol sequence which is different than said first known symbol sequences, and steps b) to e) are performed separately to both said first transmission sequence and said second transmission sequence.

14. A method for generating an estimate of the impulse response of a radio channel, comprising:

determining the value of a quantity that describes the estimated quality of a received signal, generating an initial estimate of the impulse response of a radio channel, equalizing the received signal by using the initial estimate, comparing the determined value of the quantity that describes the estimated quality of the received signal against a certain first threshold, if said comparison shows the estimated quality of the received signal to be better than indicated by said first threshold, obtaining feedback information from the signal after equalization, generating an updated estimate of the impulse response of the radio channel by using said feedback information, equalizing the signal by using said updated estimate, and decoding the equalized signal;

between equalizing the received signal and decoding the equalized signal, processing the signal, and between obtaining feedback information from the signal after equalization and generating said updated estimate, inversely processing the feedback information to cancel from the feedback information certain effects caused by said processing the signal.

15. A method according to claim 14, wherein said equalizing the signal comprises equalizing the signal by using said updated estimate and said feedback information.

16. A method according to claim 14, comprising:

if said comparison shows the estimated quality of the received signal to be better than indicated by said first threshold, obtaining feedback information from the signal after equalization, generating an updated estimate of the impulse response of the radio channel by using said feedback information, equalizing the signal by using said updated estimate and iteratively repeating at least once said steps of obtaining feedback information, generating an updated estimate and equalizing the signal.

17. A method according to claim 16, comprising:

after a certain iterative round of obtaining feedback information, generating an updated estimate and equalizing the signal, at least partly comparing the signal to the signal before said iterative round, and if the comparison shows that the compared signals differ from each other less than a certain second threshold, terminating said iteration.

18. A method according to claim 16, comprising:

setting a maximum number for iterative rounds of obtaining feedback information, generating an updated estimate, equalizing the signal and comparing it to the signal before said iterative round, and if said maximum number has been reached, terminating said iteration.

19. An arrangement for generating an estimate of the impulse response of a radio channel, comprising:

a channel estimator for generating an initial estimate of the impulse response of a radio channel, a signal equalizer for equalizing a signal, the signal equalizer being coupled to the channel estimator so as to receive the estimate generated by the channel estimator, a decoding unit coupled to the signal equalizer for decoding the equalized signals, and means for coupling feedback information from a point located after the signal equalizer into the channel estimator and the signal equalizer;

wherein:

the channel estimator is arranged to generate an updated estimate of the impulse response of the radio channel by weighting said feedback information according to an estimated reliability of a decoding operation performed after said equalizing, and the signal equalizer is arranged to re-equalize the signal by using said feedback information.

20. An arrangement according to claim 19, wherein the decoding unit comprises a series coupling of a first decoder and a second decoder, and the coupling for providing feedback information is made after said first decoder but before said second decoder.

21. An arrangement according to claim 19, wherein the decoding unit comprises a series coupling of a first decoder and a second decoder, and the coupling for providing feedback information is made after said second decoder.

22. An arrangement according to claim 19, wherein the coupling for providing feedback information to the channel estimator is made after the signal equalizer but before the decoding unit.

23. An arrangement according to claim 19, comprising a controlling unit arranged to estimate the quality of a received signal, so that said controlling unit is coupled to an enabling input of the channel estimator so as to either enable or disable the iterative updating of a channel estimate with feedback information depending on the estimated quality of the received signal.

24. An arrangement according to claim 23, wherein said controlling unit is coupled to a radio receiver for implementing the quality estimation of a received signal, and said controlling unit is also arranged to receive an indication of estimated reliability in at least one of signal detecting and channel decoding, and said controlling unit is arranged to set the maximum number of iterations in said iterative updating of a channel estimate on the basis of at least one of the estimated quality of a received signal and said estimated reliability.

25. An arrangement according to claim 19, comprising a first signal processing block coupled between the signal equalizer and the decoding unit, and a second signal processing block coupled between the decoding unit and the channel estimator, so that said second signal processing block is arranged to implement the inverse of the signal processing operations implemented by said first signal processing block.

26. A method for generating an estimate of the impulse response of a radio channel, comprising:
   generating an initial estimate of the impulse response of a radio channel,
   equalizing a signal by using the initial estimate,
   obtaining feedback information from the signal after equalization,
   if a monitored signal to noise ratio, carrier to interference ratio or other quality-indicating quantity of a received signal is better than a threshold, generating an updated estimate of the impulse response of the radio channel by using said feedback information,
   equalizing the signal by using said updated estimate and said feedback information, and
   decoding the equalized signal;
   between equalizing the signal and decoding the equalized signal, processing the signal, and
   between obtaining feedback information from the signal after equalization and generating said updated estimate, inversely processing the feedback information to cancel from the feedback information certain effects caused by said processing the signal.

27. A method for generating an estimate of the impulse response of a radio channel, comprising:
   generating an initial estimate of the impulse response of a radio channel,
   equalizing a signal by using the initial estimate,
   obtaining feedback information from the signal after equalization,
   generating an updated estimate of the impulse response of the radio channel by using said feed back information,
   equalizing the signal by using said updated estimate and said feedback information,
   decoding the equalized signal, and
   iteratively repeating the generation of said updated estimate of the impulse response of the radio channel and equalizing the signal by using said updated estimate and said feedback information, wherein the number of iterations of generating said updated estimate of the impulse response of the radio channel and the number of iterations of equalizing the signal by using said updated estimate and said feedback information are determined separately.

28. An arrangement for generating an estimate of the impulse response of a radio channel, comprising:
   a channel estimator for generating an initial estimate of the impulse response of a radio channel,
   a signal equalizer for equalizing a signal, the signal equalizer being coupled to the channel estimator so as to receive the estimate generating the channel estimator,
   a decoding unit coupled to the signal equalizer for decoding the equalized signal, and
   means for coupling feedback information from a point located after the signal equalizer into the channel estimator and the signal equalizer;
   wherein;
   the channel estimator is arranged to generate an updated estimate of the impulse response of the radio channel by weighting said feedback information according to an estimated reliability of a decoding operation performed after said equalizing, and
   the signal equalizer is arranged to re-equalize the signal by using said feedback information;
   between equalizing the signal and decoding the equalized signal, processing the signal, and
   between said means for coupling and generating said updated estimate, inversely processing the feedback information to cancel from the feedback information certain effects caused by said processing the signal.

29. An arrangement for generating an estimate of the impulse response of a radio channel, comprising:
   a channel estimator for generating an initial estimate of the impulse response of a radio channel,
   a signal equalizer for equalizing a signal, the signal equalizer being coupled to the channel estimator so as to receive the estimate generated by the channel estimator,
   a decoding unit coupled to the signal equalizer for decoding the equalized signal, and
   means for coupling feedback information from a point located after the signal equalizer into the channel estimator and the signal equalizer;
   wherein:
   the channel estimator is arranged to response to a monitored signal to noise ratio, carrier to interference ratio or other quality-indicating quantity of a received signal being better than a threshold by generating an updated estimate of the impulse response of the radio channel by using said feedback information, and
   the signal equalizer is arranged to re-equalize the signal by using said feedback information;
   between equalizing the signal and decoding the equalized signal, processing the signal, and
   between said means for coupling and generating said updated estimate, inversely processing the feedback information to cancel from the feedback information certain effects caused by said processing the signal.

30. An arrangement for generating an estimate of the impulse response of a radio channel, comprising:
   a channel estimator for generating an initial estimate of the impulse response of a radio channel,
   a signal equalizer for equalizing a signal, the signal equalizer being coupled to the channel estimator so as to receive the estimate generating by the channel estimator,
   a decoding unit coupled to the signal equalizer for decoding the equalized signal, and
   means for coupling feedback information from a point located after the signal equalizer into the channel estimator and the signal equalizer;
   wherein:
   the channel estimator is arranged to generate an updated estimate of the impulse response of the radio channel by using said feedback information, the signal equalizer in arranged to re-equalize the signal by using said feedback information, and the channel estimator and the signal equalizer are arranged to iteratively repeat the generation of said updated estimate of the impulse response of the radio channel and the equalization of the signal by using said updated estimate and said feedback information, the number of iterations of generating said updated estimate of the impulse response of the radio channel and the number of iterations of equalizing the signal by using said updated estimate and said feedback information being determined separately.

* * * * *